Aug. 9, 1960 H. O. STOELTING 2,948,831
OVERVOLTAGE PROTECTIVE GAPS
Filed Aug. 1, 1956 2 Sheets-Sheet 1
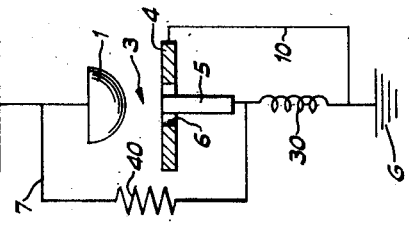
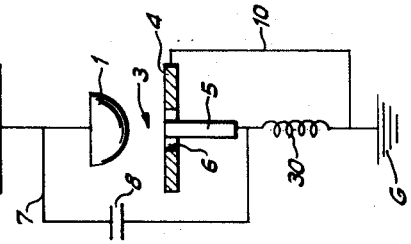
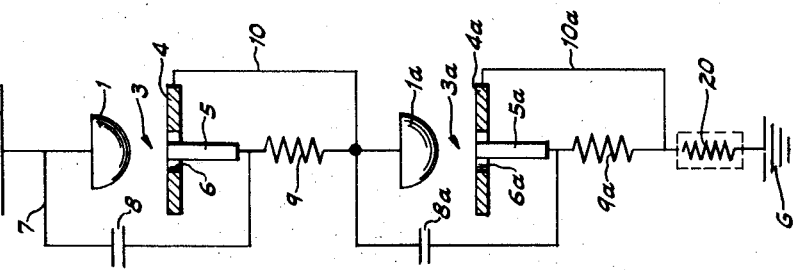
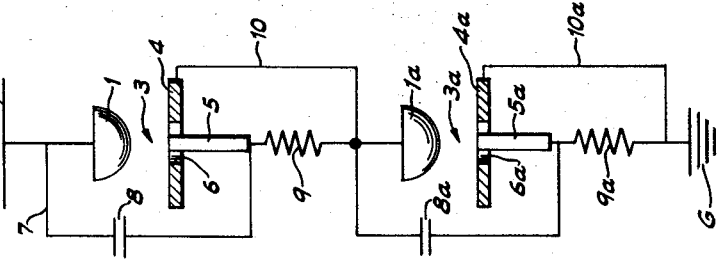
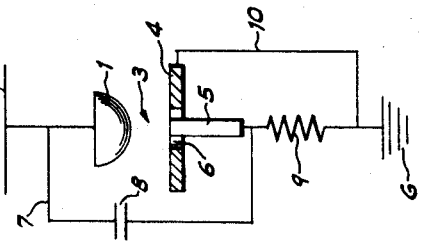
INVENTOR.
Herman O. Stoelting.
BY
Attorney.

Aug. 9, 1960          H. O. STOELTING          2,948,831
OVERVOLTAGE PROTECTIVE GAPS
Filed Aug. 1, 1956                    2 Sheets-Sheet 2

INVENTOR.
Herman O. Stoelting.
BY
Arnold J. Ericsen
Attorney

United States Patent Office 2,948,831
Patented Aug. 9, 1960

2,948,831

OVERVOLTAGE PROTECTIVE GAPS

Herman O. Stoelting, Milwaukee, Wis., assignor to McGraw-Edison Company, a corporation of Delaware Filed Aug. 1, 1956, Ser. No. 601,454

5 Claims. (Cl. 315—36)

The present invention relates to overvoltage protection of power circuits, and is particularly directed to an improved spark-gap assembly for use in draining surge voltages from the circuits either directly or in combination with a conventional non-linear resistance or valve element.

Protective gaps, whether used as gaps of lightning arresters or as spill gaps, are designed to have a 60 cycle sparkover voltage higher than the voltage of the system on which the gaps are to be used. This is to prevent sparkover of the gaps on the power frequency overvoltages, harmless to system insulation, which occasionally can and do occur. Another design requirement of the protective gap is to have the lowest possible impulse sparkover voltage so as to give the maximum protection to system insulation. The impulse sparkover voltages of gaps generally are higher than the crest of the 60 cycle sparkover voltages.

High impulse sparkover voltages occur because the time required to ionize the gas in a gap and initiate sparkover is not inversely proportional to the applied voltage, but is a hyperbolic function between voltage and time. From this, it will be evident that in the 4200 microseconds from zero to crest of a 60 cycle voltage wave, that there is sufficient time to ionize the gas and initiate sparkover at low voltage. In order to spark over a gap in one microsecond or less on the rapid rise of impulse voltages, a much higher crest voltage is required. The ratio of the impulse sparkover voltage to the crest of the 60 cycle sparkover voltage is called the impulse ratio. It is the ambition of every designer of overvoltage protective gaps to obtain an impulse ratio of unity.

The impulse ratio of a gap is dependent upon several factors, among which are the shape of the electrode and the shape and dimensions of the supporting dielectric between the electrodes. The design of gaps having a low impulse ratio has always been a difficult trial and error procedure. As an example of the difficulties involved, a spill gap having a completely satisfactory impulse ratio has not been designed to date. As a result, spill gaps are not used to any great extent on electric power circuits. It will also be apparent, that when spill gaps are used, it is necessary to provide a back-up device to interrupt the flow of follow current, such device commonly being in the form of a fuse cutout or an oil circuit recloser.

Even in the gap structure of valve type lightning arresters, which represent the latest development in spark gaps, impulse ratios appreciably greater than one are encountered. Special measures, such as the use of radioactive materials and the application of high dielectric stress to special insulators have been suggested for reducing impulse ratios. Even with these measures, the lowest impulse ratios obtainable as of the present date are not as low as could be desired. In addition, the reduction of impulse ratios has only been accomplished by a trial and error method.

The spark-gap assembly of the present invention permits impulse ratios not only approaching unity, but appreciably less than one. In other words, I have found it possible to provide a gap having an impulse sparkover voltage lower than the 60 cycle sparkover voltage. In addition, the impulse ratio can be controlled to a degree by varying the values of capacitance and resistance in the gap circuit.

It is therefore an object of the present invention to provide an improved spark-gap assembly which is capable of providing an impulse ratio of unity or less than unity, and without requiring tedious trial and error procedures to obtain this ratio.

It is another object of the present invention to provide a lightning protective gap which comprises a capacitor and a resistor in combination with a three electrode gap member.

It is a further object of the present invention to provide a lightning protective gap assembly including a three electrode gap member wherein the electrode structure utilizes an auxiliary control gap electrode positioned in the proximity of one of two cooperating main gap electrodes to jointly provide a control gap with that one electrode.

It is still another object of the present invention to provide a lightning protective gap which may be operated as a unitary assembly as a spill gap means connected between line and ground, and which may further be connected with a like assembly to overcome the problem of shorting of the discharge gap by birds or other foreign objects.

It is a still further object of the present invention to provide a lightning protective gap of an improved design for use with a valve type arrester.

An object of another embodiment of the invention is to provide such lightning protective gap in combination with a capacitor and reactor to obtain control of impulse ratio.

A further embodiment of the invention is to provide discharge gap means in combination with a resistor and reactor for control of impulse ratio.

These and other objects of the invention will become apparent upon consideration of the following detailed description when taken in consideration with the accompanying drawings wherein:

Fig. 1 is a schematic circuit diagram of one embodiment of the invention;

Fig. 2 is a schematic circuit diagram of an alternative embodiment wherein two units of the novel discharge gap assembly are combined to provide a spill gap arrangement wherein birds or other foreign objects will not disturb the operating characteristics thereof;

Fig. 3 is a schematic circuit diagram of an alternative embodiment wherein the novel discharge gap assembly is used in combination with a valve element to provide an improved valve type lightning arrester;

Fig. 4 is a schematic circuit diagram of an alternative embodiment of the invention wherein the discharge gap assembly is used in combination with a capacitor and inductive reactance;

Fig. 5 is a schematic circuit diagram of still another embodiment of the invention with the novel discharge gap assembly as used in combination with a resistor and inductive reactance;

Figure 6:
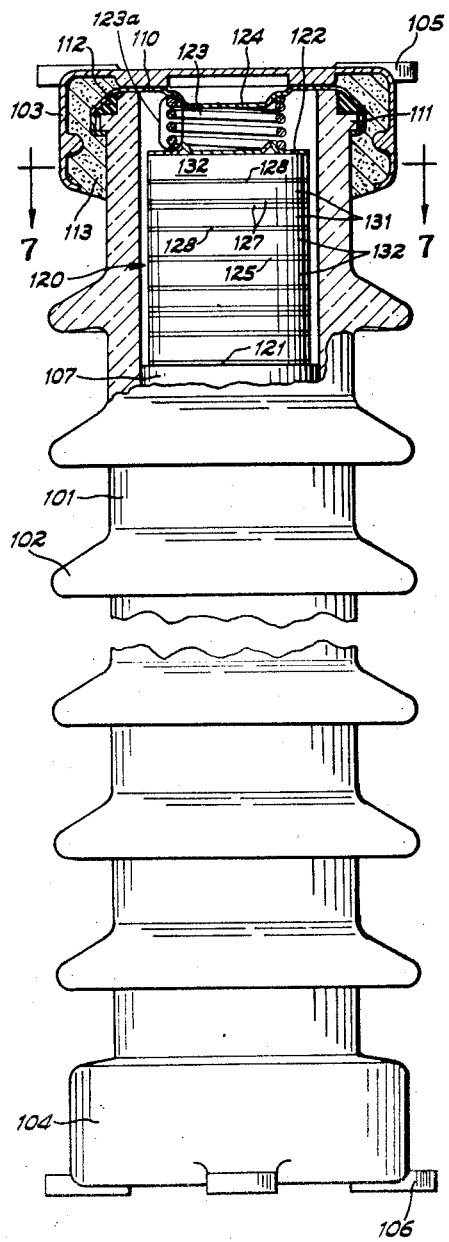
Fig. 6 is a vertical view, partly in section, illustrating another embodiment of the discharge gap assembly of this invention as used in a conventional lightning arrester structure.

Referring now to Fig. 1, there is shown in the diagram the most elementary use of the present invention in the form of a spill gap for overvoltage protection of electrical equipment, which embodiment includes a three-electrode gap comprising a hemispherical electrode 1 connected to a power line 2 and providing a fixed main discharge gap dimension 3 with a plate type electrode 4 and an auxiliary control electrode 5. It will be noted that the plate electrode is provided with a transverse opening 6 for receiving the rod-like electrode 5. The auxiliary control electrode 5 is preferably seated centrally of the plate-like electrode 4 to provide a toroidal control gap therebetween. The hemispherical electrode 1 is connected by means of a bypass circuit 7 having a series capacitor 8 to the electrode 5. Electrode 5 is connected to a resistor 9 which has its opposite terminal connected with ground G. The plate-like electrode 4 is also connected to ground by means of the circuit 10, bypassing the auxiliary electrode 5 and the resistor 9.

It is to be noted that the three-electrode gap assembly comprising the hemispherical electrode 1, the plate-like electrode 4 and the auxiliary control electrode 5 are of a design disclosed and claimed in the copending application of Graham H. Johnson, Serial No. 378,495, filed on September 4, 1953, now Patent No. 2,881,346, for Discharge Gap, and assigned to the same assignee as is the present invention. In that application, the discharge gap was disclosed to provide a control electrode which cooperates with one main electrode to define a discharge initiating auxiliary gap whose flashover voltage is relatively independent of humidity, temperature and pressure. The breakdown of the gap is not dependent upon the formation of corona as an initiating atmosphere, and the gap provides consistency of flashover voltage in comparision with the prior art devices.

It will be apparent that although it is preferred to provide the auxiliary control gap between the plate-type electrode 4 and the control electrode 5, that the members may be rearranged with the control electrode 5 providing the control gap with the hemispherical electrode 1. The elements may take various form as will be hereinafter described, especially in connection with the embodiment of Figs. 6–8.

As stated previously, when the device is used as a spill gap connected between the line and ground, sparkover of the main discharge gap will drain the surge voltages from the system and initiate the flow of power follow current to ground. The flow of follow current will necessarily have to be interrupted by means of a fuse cutout or an oil circuit recloser. In the embodiment of Fig. 1, a voltage from line-to-ground prior to gap sparkover will divide between the capacitance and resistance of the circuit. For 60 cycle voltages, the values of capacitance and resistance are selected so that the voltage across the capacitance provided by the capacitor 8 reaches the sparkover voltage of the main gap 3 before the voltage across the resistor 9 reaches the sparkover voltage of the control gap provided between the members 5 and 4. The 60 cycle sparkover voltage is therefore dependent on the main gap.

Sparkover may occur from electrodes 1 and 4 directly, or from electrode 1 to the auxiliary control electrode 5, and then to electrode 4. The path is dependent upon the proportions of the main gap 3 and the gap provided between surface 6 and the electrode 5, and on values used for the circuit elements 8 and 9. Thus, if all factors are selected to provide the sparkover path from the hemispherical electrode 1 to the control electrode 5, this will short out the capacitance and establish the entire line voltage on the resistor 9, resulting in immediate flashover of the control gap from the electrode 5 to the surface of the aperture 6 of the electrode 4. The two arcs then combine and the control electrode is switched out of the circuit.

The capacitor of the circuit offers very little impedance to an impulse because of the high frequency of an impulse wave, so that the resistor 9 has a greater percentage of the voltage appearing on the line 2 across it, than it will have at 60 cycles. The high voltage across the resistor 9 will cause the control gap to spark over. The sparkover of the control gap provides abundant ionization for the main gap 3, and initiates sparkover of this gap with only a low voltage appearing across the capacitor 8. By selecting the proper values of capacitance, resistance and control gap spacing, it is thus possible to obtain a low predetermined impulse ratio.

It will be apparent, that while the above method of treating an impulse as a high frequency sine wave is satisfactory for a qualitative understanding of the function of the circuit, it will, however, be necessary to use transient circuit analysis to obtain the actual voltage division between the capacitor 8 and the resistor 9. Such transient analysis is well understood, and will be apparent to those skilled in the practice of circuit analysis.

The above analysis leads to the conclusion that the sparkover of the present gap assembly can be made to decrease with an increase in the frequency of the applied voltage. In the case of impulse voltages, this reduction in sparkover due to division of the voltage between the capacitance 8 and the resistance 9 will be partially offset by an increase in the formative time-lag of the arcs in the gaps. It will be evident that interchanging the line and ground connections to the gap will not affect the operation of the gap.

As an example of the operation of the present invention, the sparkover characteristics of representative gaps tested are as follows:

|  | Sphere to Plate Gap | Gap per Fig. #1 |
| --- | --- | --- |
| 60 Cycle Sparkover—kv. Crest | 55 | 55 |
| Critical Impulse Sparkover—kv. Crest | 55 | 35 |
| Impulse Ratio | 1.00 | 0.64 |
| Wave Front Impulse Sparkover—kv. Crest | 60 | 46 |
| Impulse Ratio | 1.09 | 0.85 |

The column in the table at the left, represents the sparkover characteristics of the gap defined between a hemispherical electrode similar to the electrode 1 of the embodiment of Fig. 1 and a plate type electrode 4 without the capacitance and resistance being combined therewith. This is comparable to the type of gap which might ordinarily be used. The right hand column is the sparkover characteristic of the same gap when using capacitance and resistance in accordance with the present invention.

The term "critical impulse sparkover" in the table refers to the crest value of a voltage rising from zero to crest in 1.5 microseconds and decaying to one-half value in 40 microseconds from the start of the wave which will just cause sparkover of the gap. The term "wave front impulse sparkover" is the crest value of an impulse wave rising at a constant rate of 50 kv. per microsecond until gap sparkover occurs.

The values of capacitance used in the test was 0.005 microfarad and a resistance of 0.5 megohm. A change in the value of either resistance or capacitance or both would result in a change in the impulse ratio. Other parameters affecting the sparkover are the spacings of the gap 3 and the control gap.

In all of the described embodiments, like parts are indicated by identical reference characters.

In the embodiment of Fig. 2, it will be apparent that a device according to Fig. 1 may be connected in series with another gap of substantially identical configuration and components for lightning protection of power circuits to overcome the disadvantage of mounting the device without a protective housing wherein birds, tree frogs, or other foreign objects might possibly get into the gap and cause a fault to ground on the line. Here again, the power line 2 is connected directly to the hemispherical gap electrode 1. The electrode 1 provides a main gap 3 with the auxiliary control electrode 5. A capacitor 8 of fixed value is connected across the electrodes 1 and 5 as described heretofore in connection with the embodiment of Fig. 1. The aperture surface 6 of the electrode 4 and the electrode 5 define an auxiliary gap therebetween. A fixed resistance in the form of a resistor 9 is connected between the auxiliary gap 5 and the hemispherical gap electrode 1–a of the series connected assembly. Another fixed capacitance 8–a is connected between the plate-type electrode 4 of the upper assembly and also with the auxiliary control electrode 5–a of the lower assembly. The plate-type electrode 4–a of the lower assembly and the electrode 1–a provides a gap 3–a therebetween. A fixed resistance 9–a is again provided between the auxiliary control electrode 5–a and ground. The electrode 5–a and the resistance 9–a are bridged by the connection 10–a connected at one end to the electrode 4–a and ground.

Each of the gap assemblies of the embodiment of Fig. 2 are adjusted to withstand the normal line-to-ground voltage unassisted. Thus, in case should any foreign objects short out either the gap 3 or 3–a, the remaining undisturbed gap assembly would function to insulate the circuit from ground. It is also to be noted that in the present embodiment, the flow of follow current would have to be interrupted by a back-up device such as a fuse cutout or an oil circuit recloser.

It will be apparent to those skilled in the art that the embodiment of Fig. 1 or of Fig. 2 may be adapted for use with a conventional valve element to provide the embodiment of Fig. 3. In the present embodiment, the spill gap of Fig. 2, utilizing two or more series gap assemblies, is adapted to be connected in series relationship with a non-linear resistance 20, which may be of conventional valve blocks made of silicon carbide or the like, or may be in the form of a solid plug compressed and positioned in the bore of a conventional lightning arrester housing, such as the material of the arrester of Fig. 6, which will be hereinafter described. In the present embodiment, any surges of sufficient magnitude to sparkover either or both of the gaps 3 or 3–a, would be drained from the system and initiate the flow of power follow current to ground through the non-linear resistance 20. The valve material 20 will function in the conventional manner to interrupt the flow of follow current without the requirement of a back-up device.

While the circuits illustrated with the gaps of Figs. 1, 2 and 3 is preferred, it will be apparent that the circuits of the embodiments of Figs. 4 and 5 may also be used to maintain low impulse ratios and to obtain a control of that ratio. The principal reason for preference for the first-mentioned circuits is that the capacitor and resistor are presently of relatively lower cost, than the reactor used in the embodiments of Fig. 4 and Fig. 5. Under some conditions, and for certain circuits, however, it may be preferable to use either the circuit of Fig. 4 or Fig. 5 in preference to that of Fig. 1.

In the case of the embodiment of Fig. 4, it will be observed that the components are substantially identical to those of the embodiment of Fig. 1, except that a reactor 30 is connected between the auxiliary control electrode 5 and ground. However, it will be noted that a capacitor 8 is bridged across the electrode 1 and the auxiliary electrode 5, as in the first embodiment. The voltage developed across the inductive reactance 30 is applied to the auxiliary control gap created between the electrode 5 and the surface 6 of the plate electrode 4. The impedance of the inductive reactance 30 increases directly with frequency, thus causing the control gap to flashover and initiate the main gap discharge and the gap 3 at a lower voltage magnitude for a steep wave front pulse, such as a lightning surge having a high percentage of high frequency harmonics than for the power frequency sine wave voltage.

It will be noted that the embodiment of Fig. 5 operates in substantially like manner to the embodiments of Fig. 1 and Fig. 4, except that a pure resistance, in the form of a resistor 40 is bridged across the main gap 3 provided by the electrode 1 and the electrodes 4 and 5. The opposite end of the resistor is connected across the auxiliary control electrode 5.

Figure 7:
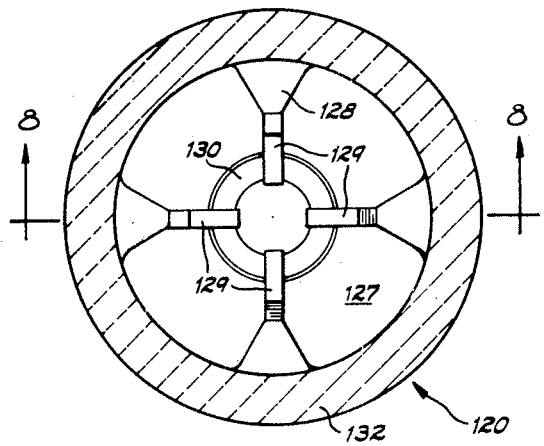
Fig. 7 is a cross sectional view taken on lines 7—7 of Fig. 6.
Figure 8:
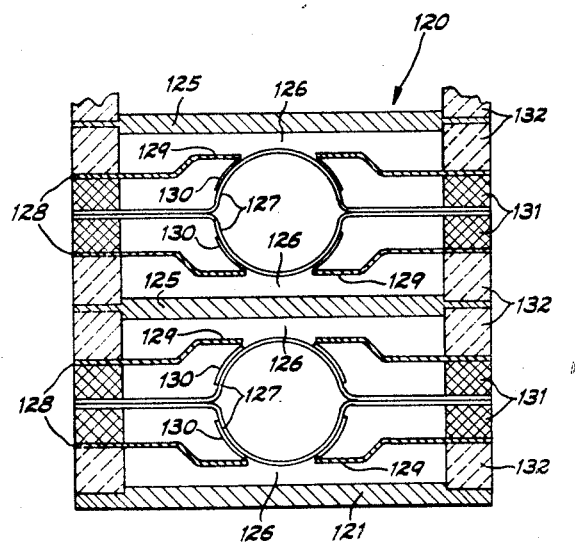
Fig. 8 is a fragmentary sectional vertical view taken on lines 8—8 of Fig. 7.

As a practical embodiment, one form of the novel gap assembly is used in combination with a valve-type arrester, as disclosed in the views of Figs. 6–8. In the particular embodiment, a conventional lightning arrester is shown provided with an insulating housing 101 including a series of conventional axially spaced skirts or petticoats 102 substantially coextensive with its length. The housing is closed at either end by means of metal end caps 103 and 104. Each of the end caps is provided with terminal lugs 105 and 106 for connection with line and ground, respectively. The arrester is of the conventional valve type and contains a valve element 107 in the form of valve blocks, or in the form of granules of silicon carbide mixed with a binder, such as sodium silicate, and compressed within the bore of the housing 101. The housing is closed by means of a conducting cap 110 which is spun in place in mechanical engagement with an annular flange 111 on the housing. A resilient gasket 112 is positioned between the flange and the conductive cap. The entire unit is enclosed by means of the previously mentioned end cap 103, which is sealed in place with a cement 113.

The novel spark gap assembly comprises a predetermined number of series gap assemblies, indicated generally by the reference numeral 120. The gap assemblies rest on a conducting plate 121 in electrical contact with the valve material 107. At the upper end of the gap assemblies there is provided a conducting plate 122 having pressed embossments engaging a compression spring 123 and its conducting shunting loop 123a. The opposite end of the spring 123 is in electrical and mechanical contact with an embossment 124 on the conducting cap 110. Thus, the entire assembly is held in secure mechanical and electrical relationship.

The novel gap assembly 120 is shown in greater detail in the views of Figs. 7 and 8, wherein each of the series gaps is provided with a main electrode member 125 in the form of a circular disc providing a main discharge gap 126 with a hemispherical main electrode 127. The hemispherical electrode may be stamped from sheet material and formed to provide the relatively hemispherical shape. The auxiliary control electrode 128 is stamped from sheet metal in the form of an annular ring having inwardly extending, circumferentially spaced electrode fingers 129, respectively resting upon a formed insulating washer 130. The washer 130 also provides a means for spacing the electrode from the hemispherical electrode 127 to provide an auxiliary gap therebetween.

When the construction is compared to Fig. 1, it will be apparent that the essential electrode configurations are provided for operating in the manner described in connection with the schematic diagram.

The resistance is provided by means of a resistor ring 131, which may be carbon and having a resistance of the order of 100,000 ohms. Capacitance is supplied by means of the capacitor spacer 132 in the form of a high dielectric ceramic member, having a dielectric constant of the order of 1,000 to provide a fixed capacitance of the order of .005 microfarad between the electrodes 125 and 128.

It will be noted that each of the various members in like form are stacked in opposed relationship with another series to provide alternating gap structures with a predetermined number of main discharge gaps 126.

I claim:
1. A spark gap device including spaced metallic electrodes forming a main spark gap between adjacent pairs of electrodes, each such main spark gap including a pair of superimposed spacers disposed between said adjacent electrodes and maintaining them in spaced apart relation, a metallic auxiliary control electrode having a first portion interposed between said spacers and a second portion in radially spaced relationship with one only of said pair of electrodes and together therewith providing a control spark gap having a spacing which is only a minor fraction of the main gap spacing, the spacer disposed between said one electrode and said control electrode being a resistor, the other spacer, together with said control electrode and the other electrode, comprising a capacitor, said control electrode being removed from the main discharge path between said electrodes, the sparkover potential of said control gap being only a minor fraction of that of said main gap, the change in impedance of said capacitor with frequency resulting in a relatively greater voltage appearing across said resistor when a steep wave front impulse is impressed across said spark gap device than when a sixty cycle voltage of the same magnitude is impressed across said device, sparkover of said auxiliary control spark gap incident to a predetermined voltage drop across said resistor ionizing said main discharge gap and lowering the sparkover potential thereof.

2. A spark gap device having a plurality of spark gaps in series circuit relation comprising, in combination, a plurality of disk-like metallic electrodes arranged in a column and forming a main spark gap between adjacent pairs of electrodes, each main spark gap having a pair of superimposed annular spacers disposed between said pair of disk-like electrodes and maintaining them in spaced apart relation, an auxiliary metallic control electrode interposed between said spacers and having a central aperture therein, portions of the margin of said auxiliary electrode defining said central aperture being in radially spaced relationship with one only of said pair of disk-like electrodes and together therewith forming an auxiliary control gap having a spacing substantially less than that of said main spark gap, said auxiliary control electrode being removed from the main discharge path between said pair of electrodes, the spacer between said control electrode and said one electrode being of a material of high resistivity and the other spacer being of a material of high dielectric constant.

3. A spark gap for a series gap stack comprising, in combination, a pair of spaced apart metallic discharge electrodes jointly providing a main discharge gap therebetween, one of said electrodes having a large convex surface facing the other electrode, a pair of superimposed spacer blocks disposed between said electrodes and maintaining them in spaced apart relationship, a metallic control electrode interposed between said blocks and surrounding said convex surface, portions of said control electrode being closely adjacent but spaced from said convex surface and together therewith forming a control spark gap having a spacing which is only a minor fraction of the spacing of said main discharge gap, the spacer block between said control electrode and said one discharge electrode being characterized by a relatively high resistivity and the other spacer block being characterized by a relatively high dielectric constant, the sparkover potential of said control gap being only a minor fraction of the sparkover potential of said main gap.

4. A spark gap for a series gap stack comprising, in combination, a pair of spaced apart disk-like metallic discharge electrodes jointly providing a main discharge gap therebetween, one of said discharge electrodes having a central hemispherical surface facing the other discharge electrode, a pair of superimposed annular spacers disposed between said discharge electrodes and maintaining them in spaced apart relation, a disk-like metallic control electrode interposed between said spacers and having a central aperture therein, portions of the margin of said control electrode defining said aperture being in radially spaced relation to said hemispherical surface and jointly forming a control gap therewith having a spacing substantially less than the spacing of said main gap, the spacer between said control electrode and said one discharge electrode being a resistor and the other spacer being characterized by a relatively high dielectric constant, the sparkover potential of said control gap being only a minor fraction of the sparkover potential of said main gap.

5. A spark gap device having a plurality of gaps in electrical series circuit relation comprising, in combination, a pile of disk-like electrodes arranged in a column and forming a main spark gap between adjacent pairs of electrodes, one of said electrodes having a central convex surface facing the other electrode, each main spark gap including a pair of superimposed annular spacers disposed between said pair of electrodes and maintaining them in spaced apart relation, a metallic control electrode interposed between said spacers and having a central aperture surrounding said convex surface, portions of the margin of said control electrode defining said aperture being adjacent to but in spaced relation with said convex surface and jointly therewith forming a control spark gap having a spacing considerably less than the spacing of said main gap, said control electrode being removed from the main discharge path of least spacing between said convex surface and the other disk-like electrode, the spacer disposed between said one electrode and said control electrode being a resistor, the other spacer being of a high dielectric constant material and together with said control electrode and the other electrode forming a capacitor, the change in impedance of said capacitor with frequency resulting in a relatively greater voltage appearing across said resistor when a steep wave front impulse is impressed across said spark gap device than when a 60 cycle voltage of the same magnitude is impressed across said device, sparkover of said control gap incident to a predetermined voltage drop across said resistor ionizing said main discharge gap and lowering the sparkover potential thereof.

References Cited in the file of this patent

UNITED STATES PATENTS

| 855,440 | Apt | June 4, 1907 |
| 1,477,304 | Allcutt | Dec. 11, 1923 |
| 1,477,305 | Allcutt | Dec. 11, 1923 |
| 1,612,354 | Brackett | Dec. 28, 1926 |
| 2,335,240 | Golde | Nov. 30, 1943 |
| 2,508,954 | Latour | May 23, 1950 |
| 2,623,197 | Kalb | Dec. 23, 1952 |

FOREIGN PATENTS

| 215,001 | Switzerland | Aug. 16, 1941 |
| 612,219 | Great Britain | Nov. 10, 1948 |
| 302,293 | Switzerland | Dec. 16, 1954 |